US012590541B2

(12) United States Patent     (10) Patent No.:   US 12,590,541 B2
Lewis et al.     (45) Date of Patent:    Mar. 31, 2026

(54) POWER OPTIMIZATION THROUGH ORCHESTRATION AND PRIORITIZATION OF MACHINES AND FUNCTIONS

(71) Applicant: Modular Mining Systems, Inc., Tucson, AZ (US)

(72) Inventors: Michael W. Lewis, Tucson, AZ (US); Edward A. Branscombe, Oro Valley, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 0 days.

(21) Appl. No.: 18/407,229

(22) Filed: Jan. 8, 2024

(65) Prior Publication Data

US 2024/0141787 A1     May 2, 2024

Related U.S. Application Data

(63) Continuation of application No. 16/638,674, filed as application No. PCT/US2018/047096 on Aug. 20, 2018, now Pat. No. 11,867,063.

(Continued)

(51) Int. Cl.
| | |
|---|---|
| *E21F 17/06* | (2006.01) |
| *G05B 13/04* | (2006.01) |
| *G06F 16/2458* | (2019.01) |

(52) U.S. Cl.
CPC ............ *E21F 17/06* (2013.01); *G05B 13/048* (2013.01); *G06F 16/2465* (2019.01); *H02J 2310/52* (2020.01)

(58) Field of Classification Search
CPC .... E21F 17/06; G05B 13/048; G06F 16/2465; H02J 2310/52; G06Q 30/0605; G06Q 50/06; G06Q 50/00
See application file for complete search history.

(56) References Cited

U.S. PATENT DOCUMENTS

| | | | |
|---|---|---|---|
| 8,621,248 B1 * | 12/2013 | Weber | ..................... G06F 30/20 |
| | | | 713/320 |
| 2014/0032006 A1 * | 1/2014 | Tojima | .................. B60L 3/0046 |
| | | | 700/295 |

(Continued)

OTHER PUBLICATIONS

Mohagheghi et al. "Managing Industrial Energy Intelligently" IEEE Industry Applications Magazine • Mar./Apr. 2014 (Year: 2014).*

(Continued)

*Primary Examiner* — Rehana Perveen
*Assistant Examiner* — Troy A Maust
(74) *Attorney, Agent, or Firm* — Quarles & Brady LLP

(57) ABSTRACT

Systems and methods are provided for managing power usage in mining environments. The amount of power needed to operate a set of electrical machines that are to run simultaneously is determined. Power usage by the electrical machines during a time period can be predicted based on how much power is expected to be needed by each machine. If the predicted power usage exceeds a threshold power usage, power to one or more electrical machines in the mining environment is restricted so that actual power usage in the mining environment does not exceed the threshold power usage during the specified time period. The electrical machines which will have power restricted thereto can be selected based at least in part on relative priorities for the electrical machines in the set. Power can be restricted to machines as a whole (an effective shutdown), or to specific operations of the machines.

16 Claims, 3 Drawing Sheets

Related U.S. Application Data

(60) Provisional application No. 62/548,290, filed on Aug. 21, 2017.

(56) References Cited

U.S. PATENT DOCUMENTS

| | | | |
|---|---|---|---|
| 2014/0136042 A1* | 5/2014 | Onsager | B60L 15/00 |
| | | | 701/22 |
| 2017/0155253 A1* | 6/2017 | Veda | H02J 3/008 |

OTHER PUBLICATIONS

Numbi et al. "Optimal energy management for a jaw crushing process in deep mines" 2014 (Year: 2014).*

* cited by examiner

POWER OPTIMIZATION THROUGH ORCHESTRATION AND PRIORITIZATION OF MACHINES AND FUNCTIONS

CROSS REFERENCE TO RELATED APPLICATIONS

This application is a continuation of U.S. patent application Ser. No. 16/638,674, filed under the same title on Feb. 12, 2020, which is a national phase application of International Application No. PCT/US2018/047096, filed under the same title on Aug. 20, 2018, which claims priority to U.S. Provisional Patent Application No. 62/548,290, filed under the same title on Aug. 21, 2017, which are herein incorporated by reference in their entirety for all purposes.

FIELD OF THE INVENTION

This document concerns the management of power use by electrical machines in mining environments, and more specifically centralized control of power consumption in mines through selective restriction of electrical machines based on priorities.

BACKGROUND

Mines often include a concentration of large electrical machines capable of performing various operations in different parts of the mine. Such machines include electric shovels, crushers, loaders, haul trucks, electrified lines used in trolley assists, and other machinery involved in (for example) extraction, processing, and moving of materials. The electrical machines can be massive, sometimes as large as multi-story buildings, and they sometimes handle loads weighing hundreds of tons. For example, some mills are 42 feet in diameter and have 35,000 to 42,000 horsepower motors. Mining equipment thus have enormous energy needs, and often could not all be simultaneously run at peak power consumption because there would not be sufficient available power for all the machines. Moreover, not all operations of an electrical machine have the same power demands, such that (for example) a startup operation of a machine may require many multiples more energy than other operations following startup. Because the specific electrical machines running (and operations being performed by the machines) can vary greatly over time, a mine is prone to experiencing frequent spikes and wild fluctuations in power demand. For example, if too many machines are operating at the same time, or a power-intensive operation (such as startup of a large machine) is performed when demands on available power are already high, power usage could go above desirable, acceptable, or available levels. Such variability can make it difficult to keep overall power consumption in check. Excessive power usage can be very costly, as it could strain resources and cause failures, and could incur overage fees charged by a power company ("surcharges") for surpassing preset ceilings on power use. Some utility companies will not allow for mines to pull power beyond certain levels due to the mine's effect on the power grid. If one area of a mine draws too much power, another area of the mine may shut down, resulting in additional operational challenges.

SUMMARY

The present disclosure provides example systems and methods for managing power usage in mining environments.

When a set of electrical machines that are to be operated simultaneously for mining operations is identified, the amount of power required to operate the electrical machines is determined. The set of electrical machines could include all electrical machines in the mine, or a subset thereof (such as a class of machine, machines in a region, or machines involved in specific tasks). Power usage by the set of electrical machines during a time period can be predicted based on how much power is expected to be needed by each electrical machine in the set. The predicted power usage is compared with a predetermined penalty power usage (which may be a maximum desired power usage), which is a threshold level of power use that is undesirably high because (for example) it is a strain on the power grid in the mine or because such a level would incur a surcharge ("penalty") with the power company. If the predicted power usage exceeds the threshold penalty power usage, power to one or more electrical machines in the mining environment may be restricted so that actual power usage in the mining environment does not exceed the penalty power usage during the specified time period. A machine that is restricted might be shut down, or have its functionality limited by prohibiting specific operations or activities (which may be relatively high-power consumption operations or activities). The subset of electrical machines which will have power restricted thereto can be selected based at least in part on, for example, relative priorities for the electrical machines in the set, or priorities in the mining environment.

In other versions, central control of power usage in a mining environment could involve receipt of a request to run a first electrical machine for mining operations in the mining environment during a time period. A set of electrical machines scheduled or predicted to run during the time period could be identified, and the power demanded by the first electrical machine and the electrical machines in the set of electrical machines could be determined. Predictions regarding which electrical machines are likely to run during a time period could be based on past experience and knowledge of the current state of the mine and the electrical machines, materials, and personnel therein. With this information, a total power required by the first electrical machine in combination with the electrical machines in the set of electrical machines predicted or scheduled to run during the time period could be determined. The total power required can be compared with a threshold penalty power level for the mining environment, and if the total power required exceeds the threshold penalty power level, determining which machines should receive power and which (if any) should have power thereto restricted. To do so, the priorities of the electrical machines can be accessed so that the priority of the first electrical machine relative to the electrical machines in the set of electrical machines predicted or scheduled to run can be compared. Based on the relative priorities identified, one or more power supply controllers can be used to restrict power to one or more lower-priority electrical machines in the mining environment to keep total power usage below the threshold penalty power level during the time period.

In still other versions, a centralized management system, which receives current power usage data from electrical machines in the mining environment, monitors power usage. The system could, with some regularity, determine actual power usage by all or a subset of electrical machines in the mining environment by, for example, surveying the electrical machines in the mine. If a condition is satisfied—for example, if the power usage exceeds a preset level (such as a percent of a penalty power usage), if a user makes a request to run a power-hungry electrical machine or otherwise requests an evaluation of power usage, or if a certain set of conditions (such as the location of machines, materials, and personnel and/or based on recent activities) indicate a threshold rise in power usage—the system could predict usage levels for an upcoming time period. The prediction could be based on such factors as: (1) which electrical machines are expected (likely) to run; (2) how much power is expected (likely) to be used and for how long; (3) what expected conditions (such as weather patterns) might affect the estimates of power usage; (4) how much power may be used or is available during the time period; etc. The system could then determine, if expected power usage exceeds desirable power usage levels, which electrical machines can be run without restriction, and which are restricted from running (e.g., restricted altogether, or restricted for (limited to) specified operations which might result in an unacceptable increase in power consumption in the mine). The set of restrictions could be reported to personnel (for, e.g., implementation or override), and/or power supply controllers may be used to implement the power restrictions in an automated fashion.

Such approaches provide for more intelligent management of power use in mining environments. Power usage levels can be kept in check by restricting machines and operations during certain times based on power demands and availability of power. Use of available power by electrical machines and operations can be orchestrated based on which mining activities are prioritized at particular times, allowing for more optimal power usage based on, for example, the operational priorities for the mining environment. This is particularly advantageous when, for example, a massively power-intensive operation, such as startup of an enormous machine, is to be performed. Centrally managing which machines and operations are running at various times helps reduce spikes and fluctuations in demand, minimize power usage levels that exceed threshold levels, and temporarily restrict power usage to lower-priority operations as needed while allowing higher priority operations to proceed. Additional advantages and features of the invention will be apparent from the remainder of this document in conjunction with the associated drawings.

DETAILED DISCUSSION

Figure 1:
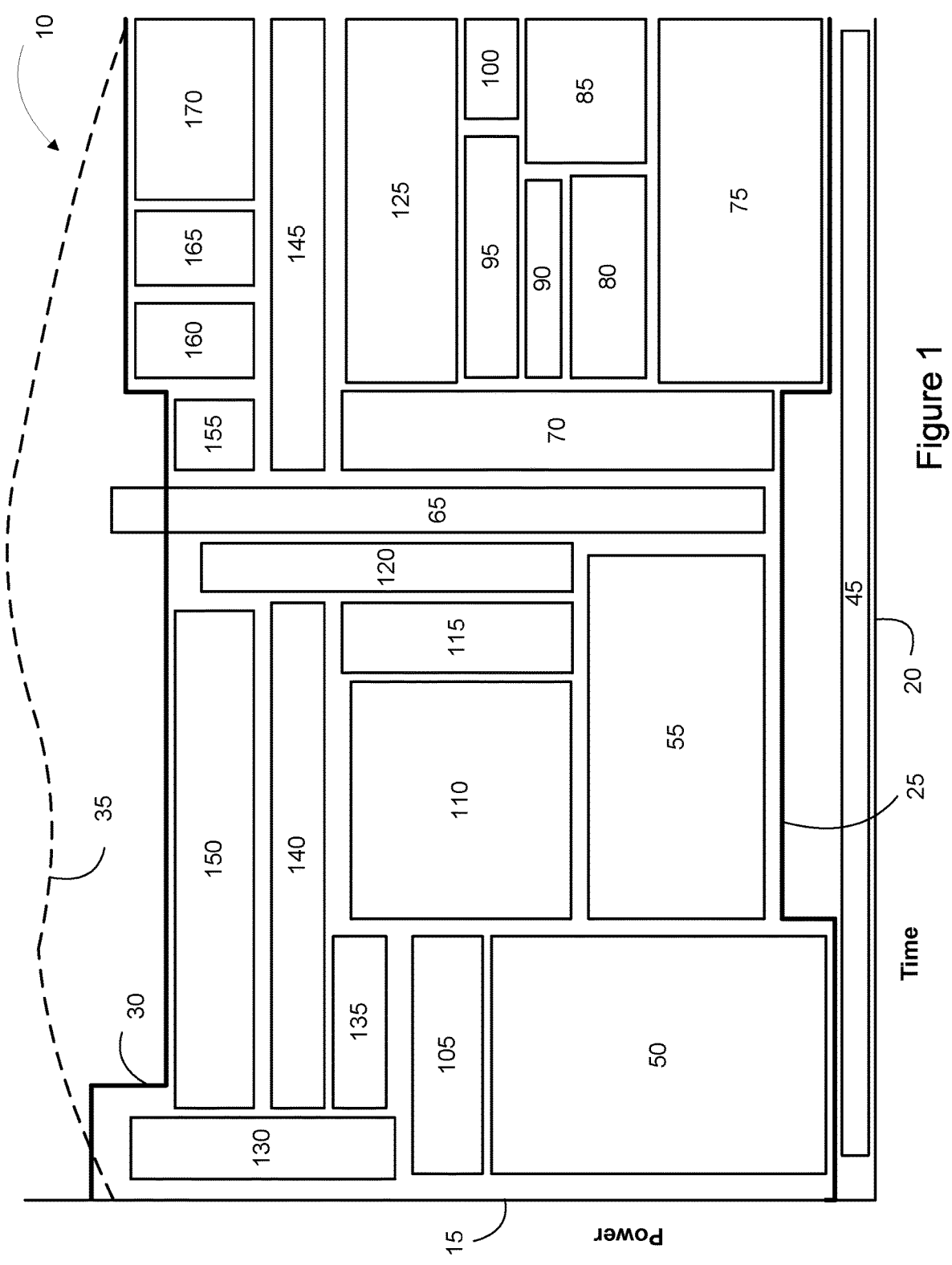
FIG. 1 represents a useful representative model for power use in an example mining environment, with power requirements on the y-axis and time on the x-axis, in accordance with one or more embodiments. The rectangular boxes are representative of power consumption by one or more electrical machines during particular time periods, with the width being directly proportional to the duration of power usage, and the height being directly proportional to the magnitude of power usage.

Referring initially to FIG. 1, power usage in a representative mining environment in a time period (for example, in a typical day) can be modeled by a two-dimensional plot 10 with power on the y-axis 15, and time on the x-axis 20. Each rectangular box (45 through 170) represents power consumption by electrical machines in the mine. The term "electrical machines" refers to all the electrical devices in the mine that facilitate mining operations; examples include construction vehicles with moving parts, as well as sources of power for one or more electrical devices in the mine, such as electrified lines that power vehicles used to transport materials from one section of the mine to another section. The units for power in the y-axis 15 could be, for example, kilowatts (kW), or any other measure of amount of energy consumed per unit of time. Power consumption could be calculated using the amount of time during which a given amount of power is used; power consumption could have units such as kilowatt-hour (kWh), which is power consumption of 1,000 watts for one hour. The unit for time on the x-axis 20 could be, for example, months, weeks, days, hours, minutes, or other blocks of time as desired.

In FIG. 1, the "taller" a box (i.e., the greater its span in the y-axis 15), the more power is required by the electrical machine(s) represented by the box, and the "wider" a box (i.e., the greater its span in the x-axis 20), the greater the time period over which power is used by the electrical machine(s) represented by the box. The machines corresponding to boxes 50 and 105, for example, consume power simultaneously (i.e., during the same block of time, with the same start and stop times), but the relatively greater height of box 50 indicates that the machines corresponding to box 50 consume relatively more power than the machines corresponding to box 105. Similarly, boxes 160 and 165 have the same height, and consequently, the machines corresponding to box 160 consume the same amount of power as the machines corresponding to box 165. However, the machines corresponding to box 160 are run (i.e., consume power) at different times, with the machines corresponding to box 160 being stopped before the machines corresponding to box 165 are started. For any given time period along the x-axis 20, if the boxes (power consumers) are stacked one on top of another, the aggregate sum of heights indicates power consumption by the electrical machines that are represented by those stacked boxes. The horizontal spaces between boxes represent time between the starts and stops of power consumers that do not overlap in time. Reducing the space between the boxes increases the amount of time during which available power is used (for mining operations or other functions), and thus reduces the amount of time during which available power is not utilized. The vertical spaces between boxes in FIG. 1 represent a "buffer" or "cushion" that is incorporated in case power consumption exceeds expectations (e.g., during unexpected spikes in power consumption by the machines running in any particular block of time), or in case available power dips unexpectedly.

For safety, a mine may wish to reserve an amount of power for critical operations and unforeseen needs. This is represented by a reserve line 25 in plot 10. Such a reserve 25 could provide a buffer, cushion, or cache such that, even if power consumption is optimized and all available power is being used by the highest-priority electrical machines, some power is left available for certain functions so that it is not necessary to decide how or when to divert power from one or more electrical machines that are running to the critical operations and unforeseen needs. Such reserved power might be immediately needed, for example, to maintain safe operations or to run a machine as part of rescue efforts. The power consumer represented by box 45 could, for example, be for a critical safety operation needed during that time span. The reserve line 25 need not be horizontal because the amount of power reserved as a buffer for critical operations could be adjusted for different time periods as deemed appropriate based on what activities are taking place in the mine or on other factors. For example, more reserve power may be desirable during the busiest times in a mining environment because the likelihood of an unforeseen need is expected to be higher.

In plot 10, penalty threshold line 30 represents a level of power usage that, if exceeded, could have undesirable consequences. For example, a mine might have a contract with a power company such that one rate is charged per kWh if power usage does not exceed a given level, and another rate is charged per kWh above the given level. Alternatively or additionally, the mine might incur a fixed or variable fee (a surcharge) if power usage exceeds a given level for a certain amount of time. The penalty threshold line 30 could also represent, or be adjusted to account for, a level of power use that strains the system or is otherwise undesirable for other reasons. If power usage is not managed, and electrical machines were allowed to operate without restriction, the power usage might be represented by an unrestricted power usage 35, which (as drawn in FIG. 10) would be excessively Power allocations could be for single electrical machines, or for any groupings or collections of electrical machines (e.g., multiple grinders) or their operations (such as startup by one or more machines). Allocations could be based on locations/areas in the mine ("regions" that may be focused on particular materials), or activities (such as grinding or loading of particular materials by one or more machines) that consume power in the mining environment and that might have higher or lower priorities relative to other groups. In other words, boxes could be allocations for such categorizations and groupings as, for example: operations (such as loading or startup) of one or more specific machines; regions of the mine engaged in certain activities (and one or more electrical machines therein); and one or more electrical machines that specialize in operating on particular classes of materials. In other words, the boxes provide directives that identify in what way power may be consumed, how much power, and when. Moreover, each directive could be conditional, such that one or more preconditions must be satisfied for a machine, operation, activity, region, etc., to be powered. Examples of what directives the boxes in FIG. 1 could specify in different situations include:

TABLE 1

| Category | Directive | Condition/Applicable Rule |
| --- | --- | --- |
| Machine-level | Machines 4, 7 | Unconditional |
| | Machine 11 | If Machine 4 is already running |
| | Machine 13 | If Machines 7, 8 are running and unrestricted |
| | Machine 15, Activities 2, 3 | If Protocol "W" is in place |
| | Machine 32 | If Sensor 5 readings are positive |
| | Machine 35 | If requested by User 12 |
| | Machine 41 | If Machine 14 is inactive |
| Activity-level | Activity 1 by Machines 15, 21 | Unconditional |
| | Activity 4 in Regions 4, 8 | Unconditional |
| | Activity 14 | If Activities 1, 2 have run within last 30 minutes |
| | Activity 19 | If Protocol "B" is in place |
| | Activity 22 | Unconditional |
| | Activity 29 | If requested by User 12, 14, and/or 15 |
| | Activity 30 | If power usage is under 90% of penalty usage |
| | Activity 33 | Unless Machines 30, 31 are currently running |
| Region-level | Region 2 | Unless Region 12 is running |
| | Region 6, Machines 1, 3 | Unconditional |
| | Region 12, Activities 7, 8 by Machines 15, 16 | If Protocol "C" remains in place |
| | Region 14 | If Sensor 12 readings are acceptable |
| | Region 17, Machines 4, 5 | If Machines 11, 12 are running |
| | Region 23 | If confirmed by User 19 |
| | Region 31 | If power usage is under 70% of penalty usage |
| | Region 45 | If Region 14 is producing material 2 | high for the vast majority of the day (except for the beginning of the day, for example, while mining operations are in the process of starting up).

Each box in plot 10 could correspond with a specific electrical machine or a set of electrical machines, such that, for example, box 50 indicates an amount of power (proportional to the height of the box) over a time period (proportional to the width and dependent on the horizontal placement of the box) for particular electrical machines (say, machine grouping "50"). Similarly, box 55 could represent a smaller amount of power (relative to box 50) over a longer period (following the end of box 50's time period) for a set of other electrical machines (say, machine grouping "55"). Tall, narrow boxes represent a larger amount of power is used by one or more electrical machines for a shorter period of time, and short, wide boxes represent a smaller amount of power is used by one or more electrical machines for a longer period of time.

As suggested by Table 1, the specific electrical machines that are to be powered—either without restricting which operations are to be performed by the electrical machines, or with restrictions on particular operations—can be specified in different ways. The system need not be limited to only one of the above "levels" of designating machines, and a combination of designations could be used. At the machine level, one or more machines can be permitted to operate without condition (such as with machines 4 and 7 in Table 1). As examples of conditions that may be placed, a machine can be designated to operate, but only if it is already running (such as with machine 11) because, for example, the startup operation for machine 11 might be so power-intensive that diverting power for its startup is not a priority. Machines can be designated to run if specific other machines are running without restriction (such as with machine 13) because, for example, the materials to be operated on by the machines are not available unless the other machines are fully functional. Other machines may be enabled to perform particular operations or activities, but only if a particular protocol is in place (such as with machine 15). Protocols could designate a status, condition, priority, limitation, etc. in the mine, resulting from, for example, conditions, locations, and/or availability of particular machines, materials, personnel, or due to exigent circumstances or unsafe conditions. Determining whether a precondition is met could be based on readings from one or more sensors in the mine, and so one or more machines (such as with machine 32) could be allocated power if certain sensor readings indicate desired conditions, such as, for example, whether it is safe to proceed in a certain way. One or more machines could also be allocated power if a request is made by a user (such as with machine 35) because the user might have, for example, specialized knowledge, particular responsibilities, or a certain authority. Moreover, a machine can be enabled if another machine is inactive (such as with machine 41) because, for example, only having one of the electrical machines running at any one time reduces contentions (that is, the machines getting in each other's way).

Similarly, one or more activities performed by one or more machines, or in one or more regions (by whichever machines engage in the activity in the regions), could be allocated power (such as with activities 1 and 4 in Table 1). One or more activities could also be allowed if other activities have been performed (or completed) for a certain task recently (e.g., within a specified time, such as with activity 14) because, for example, performance or completion of the task would indicate a byproduct is available for processing. An activity can be allotted power if a certain protocol is in place (such as with activity 19), or an activity can be enabled unconditionally by all the machines in all regions that engage in the activity (such as with activity 22). Activities could also be allowed if requested by one or more users (such as with activity 29), or if power usage in the mine is not close to undesirable levels (such as with activity 30), or unless other specified machines are running (such as with activity 33).

At the region level, one or more regions (i.e., all the machines in specified regions) could be enabled unless another specified region is running (such as with region 2) because, for example, both regions running simultaneously would deplete a byproduct being processed. A region could be enabled with respect to specified machines (such as with region 6) because, for example, certain materials or personnel are available in the region. One or more regions could be enabled with respect to specified activities by specified machines if a specified protocol is in place (such as with region 12). A region could be enabled if readings from a sensor in the mine are acceptable (such as with region 14), or specified machines operating in a region could be enabled if other specified machines are running as well (such as with region 17). A region's allotment of power could depend on whether a confirmation is received from a user (such as with region 23), or on whether power usage is at a specified level (such as with region 31). One or more regions could also be enabled if another specified region is producing a particular material (such as with region 45) because, for example, the materials are processed by the one or more regions. These are only examples of directives, and the conditions suggested by the examples in Table 1 could be applicable regardless of whether allocations are made at the machine, activity, or region levels.

Because boxes can be conditional, two or more boxes can overlap or occupy the same space in plot 10. The conditions/ rules may provide that overlapping boxes are mutually exclusive, in which case only one is eligible at any one time. However, if overlapping boxes are not mutually exclusive, then one box can be selected to receive power according to a rule (such as the first box to have its conditions satisfied) or priority (such as machines that are tasked to yield materials in short supply).

In example versions, the boxes in the model represented by plot 10 could represent actual power consumption over time. Alternatively, they could represent power apportioned to specified power consumers over particular time periods, although the apportioned amount of power may not be what is actually consumed. The total amount of allocated power may be set such that power consumption could not exceed the penalty power usage even if all electrical machines allocated power were active. Alternatively, power could be allocated in a way that allows for the circumstance in which actual power usage exceeds the penalty power usage if all consumers were active. If actual power usage could potentially exceed allocations, the consumers could be selected such that the chances of exceeding the penalty power usage is acceptably low based on the likelihood that the consumers would actually consume as much power as they could consume. This could involve an analysis that weights power usages for each box by likelihoods to attain a statistical sum that does not exceed the penalty power usage.

For example, in one time period, boxes A, B, C, D, and E could be selected (stacked), each with 50 units of power apportioned, summing to a possible 250 units of power if all were very active simultaneously. In this example, the penalty power usage level might be set at 200. Each box could be weighted by the likelihood (a, b, c, d, and e) that the box will account for as much power consumption as it could potentially consume, to achieve a predicted power usage as follows: predicted power usage=$aA+bB+cC+dD+eE$. If, say, a, b, c, d, and e are each 0.75 (which could be based on past experience), meaning there is a 75% likelihood that the power usage will be 50 units, the predicted power usage would be: $0.75*50+0.75*50+0.75*50+0.75*50+0.75*50$, which equals 187.5 units, a value falling below the 200 units for the penalty power usage. That is, although power consumption could reach undesirable levels, the likelihood of that happening has been determined to be relatively low, and the potential for excessive power use may be deemed acceptable.

The boxes in the plot are representations and need not necessarily have rectangular shapes in practice. For example, the top of each box need not be a flat, horizontal line, but could instead have any other shape to indicate that different amounts of power could be allocated to the electrical machines over the time period. For example, if the top line of a box has a positive (negative) slope, that would indicate that power usage for that box increases (decreases) over the time period; similarly, a sinusoidal top line would indicate that power usage for that box is expected to fluctuate. Such variation in power allotment could be useful because power consumption does not necessarily stay constant, and too much or too little power allotment is not optimal. If too much power is allotted for a box, available power that could have been put to good use may go unutilized, and if too little power is allotted, power usage could surpass desirable consumption levels. Similarly, although power may be allotted for a set time period, a task may not be completed in predicted amounts of time. If, for example, a task is completed ahead of schedule, a box is narrower, and if a task takes more time than anticipated, a box grows wider. As with power allotment, too little or too much time allotment is suboptimal. If too much time is allowed for a box, available power that could otherwise be put to good use may go unutilized, and if too little time is allotted, power usage could be undesirably high from over-lapping boxes, or subsequent scheduled boxes would be delayed.

Because actual power usage does not always track pre-dicted power usage, power consumption is preferably moni-tored to determine whether adjustments to power allotments are warranted. Different protocols can be instituted for all, a subset of, or individual boxes. For example, the electrical machines represented by one or more boxes may be allowed to exceed power and/or time allotments because of the nature of their work, their place in the material processing stage, safety considerations, priorities, etc. Conversely, the electrical machines may be restricted from exceeding power and/or time allotments, such that a machine is restricted from particular power-hungry operations or shut down entirely. A shut down could be for an indefinite amount of time, or for a limited time if a "pause" in operations would allow, for example, another electrical machine to finish a task (thus freeing up power), or if power only needs to be temporarily diverted for another, higher-priority electrical machine and then will be available once again. A "shutoff" table or database may be accessed to determine how power is to be restricted. The database may include a listing, in order, of what power consumers are not to receive power. An example shutoff/restriction order is provided in Table 2.

TABLE 2

| Power Consumer To Be Restricted | Conditions |
|---|---|
| Activity 1 by Machines 4, 5 | Unless Activity 1 is already in progress |
| Region 5, all machines | None |
| Machine 1, 2 | If sensor readings indicate it is safe to stop |
| Machines 4, 5 operating in Region 14 | If Machines 7, 8 have not started up |
| Activity 12, all machines | None |

If power allocation or consumption is excessively high, and machines are to be restricted to decrease power allot-ments or consumption, Table 2 provides that, first, activity 1 (representing, e.g., cold startup), is not allowed for machines 4, 5 (which might be, e.g., large machines with power-hungry startup operations). Such a restriction could be conditioned on, for example, activity 1 (startup) not having already begun because, for example, it is considered too wasteful to stop a machine mid-startup, or because stopping the startup process mid-stream could risk damaging the machines. If this first restriction directive is accomplished—i.e., if activity 1 by machines 4 and 5 is not already in progress and is thus restrictable—but the restriction does not sufficiently reduce power allotments, the next entry in Table 2 provides that all machines in region 5 (which might be engaged in relatively lower-priority operations) are to be restricted (without conditions). Next in Table 2, machines 1 and 2 are to be restricted if sensor readings indicate that doing so is not unsafe. These machines may be, for example, bucket loaders, and it may be unsafe to restrict power to a bucket loader if it has a loaded bucket and the loaded bucket is off the ground. Sensors could thus be used to inform the system as to the status of the bucket, confirming that the bucket loader is not full and in the air before the machines can be shut off.

If this does not achieve the goal, machines 4, 5 can be restricted from operating in region 14, according to Table 2, as long as machines 7 and 8 have not started up. This might be because machines 4 and 5 process materials prepared by machines 7 and 8, and it could be that machines 7 and 8 have costly startups and are power hungry machines, so stopping machines 4 and 5 when machines 7 and 8 are running would be wasteful because machines 7 and 8 would then also have to be stopped (and then started up again later) because the materials produced by machines 7 and 8 would not be properly handled (by machines 4 and 5). The next entry in Table 2 provides that Activity 12, which might be power-intensive uphill driving on particular railways in the mine, are to be restricted. Table 2 is merely an example, and many more kinds of entries could be provided. Any of these restrictions can be overridden, for example, in exceptional cases or if otherwise deemed appropriate/desirable by an authorized user. As discussed below, an override can cancel a power restriction in case, for example, priorities have shifted or conditions have changed such that restricting power to one or more electrical machines might be unsafe or otherwise undesirable.

Figure 2:
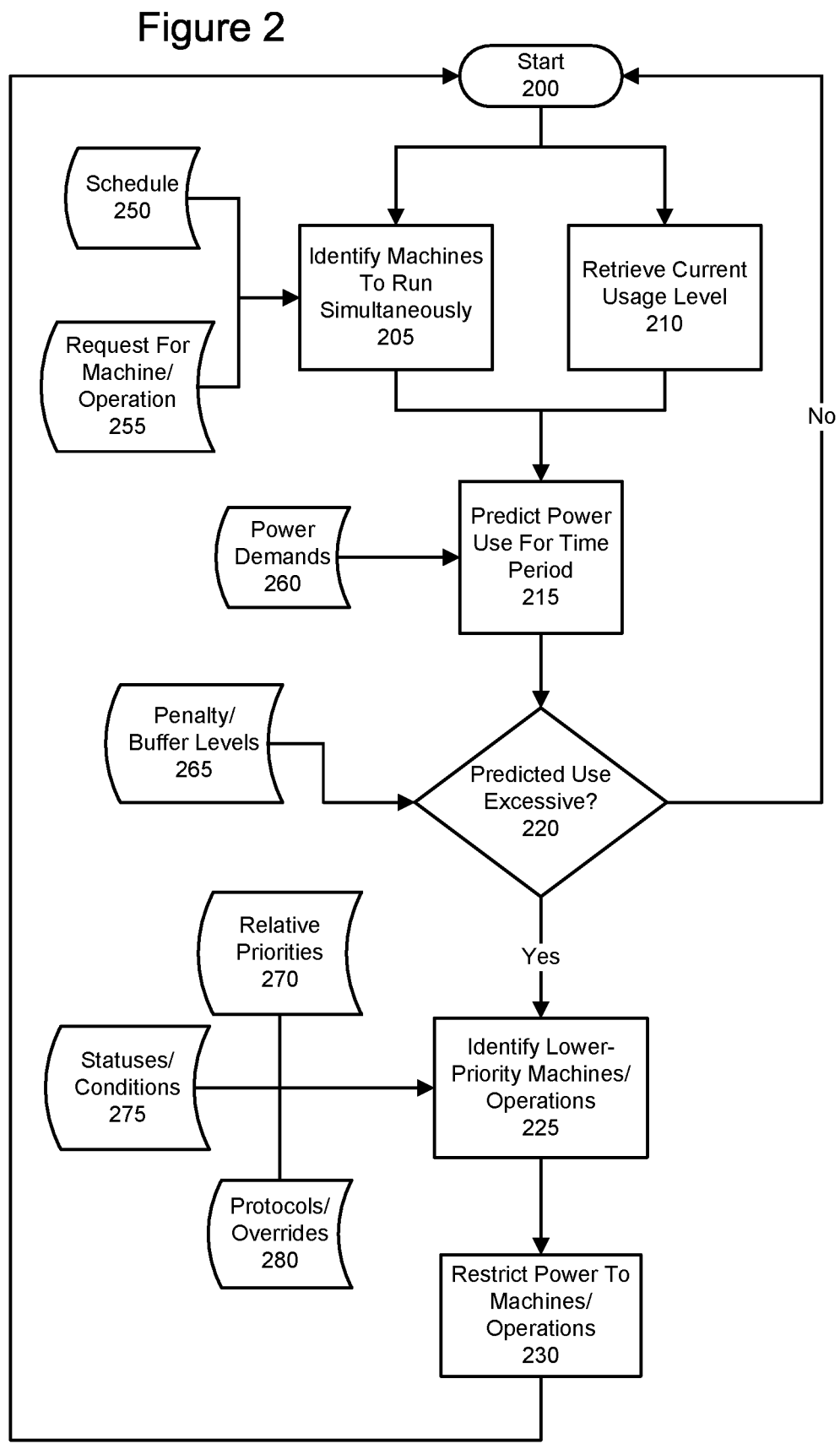
FIG. 2 provides a flowchart with example steps involved in centrally managing power use by electrical machines in the mining environment, in accordance with one or more embodiments.

Referring to FIG. 2, an example process can start (200) by identifying a set of electrical machines that are to run simultaneously (205). The machines in the set could be identified using information from a dossier or schedule (250) that identifies machines that are scheduled to run during particular time periods (such as the next 10 minutes or during specified time slots). Machines (and/or operations thereof, such as startup operations) could be added to the set if a request is received asking to run an additional machine during the time period (255). With the set of machines identified, the system can predict how much power would be required to run all the machines in the set simultaneously during the time period (215). This can be accomplished using information on how much power each machine/operation requires (260). This information can be obtained, for example, by accessing a power demand database that is populated with entries related to power requirements, as represented in example Table 3.

TABLE 3

| Machine 1: Grinder | | |
|---|---|---|
| Operation | Power Usage | Time |
| (1) Startup | 100 units | 5 minutes |
| (2) Grind | 25 units | 60 minutes |
| (3) Shutoff | −10 units | 2 minutes |
| Region 1: Material 1 | | |
| Machine | Power Usage | Time |
| (1) Grinder | 150 units | 125 minutes |
| (2) Mover | 50 units | 60 minutes |

In Table 3, it can be seen that Machine 1 (a grinder) expends 100 units of power for startup, which takes 5 minutes, 25 units of power for grinding, which is expected to take 60 minutes. Shutting the grinder off could be deemed to feed 10 units (rather than use 10 units, hence the negative value) of power back into the power grid through energy recovery mechanisms. Similarly, Table 3 indicates that, in Region 1, Machine 1 (a grinder) is expected to use 150 units of power for 125 minutes of runtime, and Machine 2 (a mover) is expected to use 50 units of power for 60 minutes of runtime. These numbers could be based on, for example, averages, medians, or other statistics. The database could provide, for example, percentiles for power usage (i.e., power usage being expected to fall below given values in, say, 10% and 90% of the time), minimum and maximum ranges, etc. Different power usage levels could also be provided for different conditions and circumstances. For example, the power expected to be used by a loader or a hauler in rainy conditions might be predicted to be higher than in dry conditions because the rain would be expected to make materials heavier, and make the ground muddier, slowing down vehicles. The applicable conditions could be identified via, for example, different protocols being put in place automatically or by users, or could be based on sensor readings, retrieval of information from online databases (such as weather reports), or in other ways.

The amount of power required to operate each electrical machine, which might be in a power demand database populated with a list of electrical machines used for mining operations in the mining environment, can be based on operation specifications and/or past power measurements. The power demand database can include power use on a whole-machine basis, and/or on a per-operation basis, such that power requirements are provided for one or more operations (such as startup, digging, conveying, etc.) of one or more electrical machines. Information on power require-ments for different operations of one or more electrical machines is useful if, for example, power is to be restricted to one or more operations of the electrical machines selected to have power restricted thereto. The level of detail could thus be adjusted based on what is needed. For example, in step 205, identifying what is to consume power simultane-ously could identify which operations are to be performed by which machines, in which regions, for which activities, etc. Predicting the amount of power that would be required for a more detailed identification of power consumption—i.e., one that specifies operations, regions, activities, etc. in identifying electrical machines to be run simultaneously—would require an appropriately greater level of specificity in power demands.

Once power usage has been predicted, it is determined whether the predicted power usage is excessive (220). This can be accomplished by comparing the predicted power usage with a penalty power usage (265), and if not already subsumed in the penalty power usage, accounting for what additional buffer/reserve is to be maintained. For example, if predicted power usage during a time period is 2000 units, and the penalty power usage is 1800, the excess power usage is 200 units. However, if the penalty power usage does not already account for the need for an additional 100 units that should be kept in reserves, then the excess power usage is actually 300 units (i.e., 200 units above penalty power usage plus 100 for reserves), and power restriction is needed to lower power usage by 300 units. If predicted power use is not excessive, then the flowchart returns to the start (200). However, if the predicted power usage is excessive, lower-priority machines, operations, regions, or activities in the set are identified (225).

The priority of an electrical machine relative to other electrical machines—i.e., the relative precedence an electri-cal machine is to be accorded if power limitations require that power be selectively apportioned—can be retrieved (270) for the relevant electrical machines. The priority information might have been submitted by an authorized user and optionally saved in a priority database. Such a priority database could include a list of all (or a subset) of the electrical machines used for mining operations in the mining environment, and an indication of precedence to be accorded to electrical machines in case power demand exceeds specified levels of power use. A priority database could provide the sort of information in Table 2 above, with the electrical machines that are to be shut off last having the highest relative priority.

The priority database can indicate what precedence is to be accorded to one or more operations of one or more electrical machines (such as startup, digging, conveying, etc.). This is useful when, for example, power-allocation decisions are to be based at least in part on power demands for particular operations in which an electrical machine engages, allowing power to be restricted to one or more operations of one or more electrical machines (without shutting off the electrical machine altogether) if the pre-dicted power usage exceeds the penalty power usage. The priority/precedence to be accorded to one or more electrical machines can be conditioned on, for example, the status, position, condition, operation, etc. of machinery or materi-als. An electrical machine can be accorded, for example, a first priority level if a certain condition is satisfied, and a second priority level that is lower than the first priority level if the condition is not satisfied. The priorities can thus be based on information on statuses and conditions in the mine (275).

As suggested above, there are situations in which restrict-ing power to an electrical machine could hinder an operation currently deemed critical, could create an unsafe condition, or would otherwise not currently be desirable because of an exceptional situation. Such "exceptions" to how electrical machines and/or operations are otherwise selected for power restriction (as opposed to in normal, non-exceptional cases) can be specified in one or more protocols that can be selectively imposed on a temporary (or indefinite) basis. Such protocols can represent a current overriding goal (such as maximizing extraction of a "bottleneck" or high-demand material), safety protocols (due to, for example, weather conditions, personnel or machinery movements, etc.), status of machinery (such as "glitchy" operation, a manufacturer recall, etc.), and so forth. As one example, a status of a currently-running electrical machine is identified, and power is not restricted to the running electrical machine if restrict-ing power would violate a safety protocol. Similarly, the electrical machines to be restricted could be selected based on a region of the mining environment in which the elec-trical machine operates, based on (for example) a protocol that raises or lowers the priority of machinery in one or more areas of a mine based on the materials being mined.

Further, because a centralized system for managing power use may not have all the information needed to account for all possible contingencies in the mining environment, the system preferably allows for overrides that, for example, exempt electrical machines to which power is otherwise to be restricted. An override by an authorized user could result in, effectively, a relative increase in priority for the electrical machine for which an override is submitted, potentially or necessarily (depending on the particulars of the override) resulting in power not being restricted to that machine. As a result, other electrical machines which would have received power may be restricted, or the override could be deemed to allow for power usage to exceed the threshold penalty power level. Overrides can have different "levels," such that (for example) the highest level ("absolute") override could serve as a prohibition against restriction in all cases, or lower-status ("conditional") overrides could effectively increase priority above certain groupings of electrical machines, activities, regions, etc., but not above others. The system may require higher levels of user authority/authorization for higher-level overrides, depending on the override; an override for safety reasons may be available to all personnel without any particular authorization, while an override that would incur a surcharge might require management-level authorization. Similarly, the requirement to power an electrical machine even if overall power consumption would exceed the threshold penalty power level could be indicated in other ways, such as in the priority database via a "highest priority," "critical," or "un-restrictable" designation, or through the use of a conditional priority (e.g., if a specified condition is satisfied, power will not be restricted to one or more electrical machines). The priorities can thus be based on information on protocols and overrides in the mine in step (280).

Optionally, the priority database could include categories or groupings of electrical machines and an indication of relative priority based on the categories and groupings. For example, the highest priority ("priority 1") might include critical electrical machines, operations, activities, or regions involved in, for example, maintaining safety. These machines are not to be restricted as long as there is enough power to keep them running. To provide greater granularity, priority 1 might specify particular operations of specified machines, or specific machines when operating in particular regions. Another level, e.g., "priority 2," could correspond with the highest-value operations, or operations without which other parts of the mine could not effectively or efficiently function. Other operations, or machines if are located in other regions, might be accorded a lower priority level.

Once the lowest priority machines that are restrictable have been determined, one or more electrical machines are either wholly restricted, or have one or more of their operations restricted (230). This can be accomplished using one or more power supply controllers that are in wired or wireless communication with each machine. There might be one central power supply controller, or multiple power supply controller distributed in the mine or the electrical machines.

Returning to the top of FIG. 2, the central system could monitor current power usage levels by retrieving, with some regularity, current power usage levels (210). If current power usage is near the penalty power usage level 30, if a particular protocol is instituted, if certain priorities are shifted, or if there is another reason to evaluate whether certain electrical machines should be restricted, the system could predict power use for an upcoming time period, such as the next 10 minutes or during a specified time slot in the future (215). The system could continue by then determining whether predicted use is excessive (220), and if so, determine which electrical machines should be restricted (225, 230) as discussed.

Figure 3:
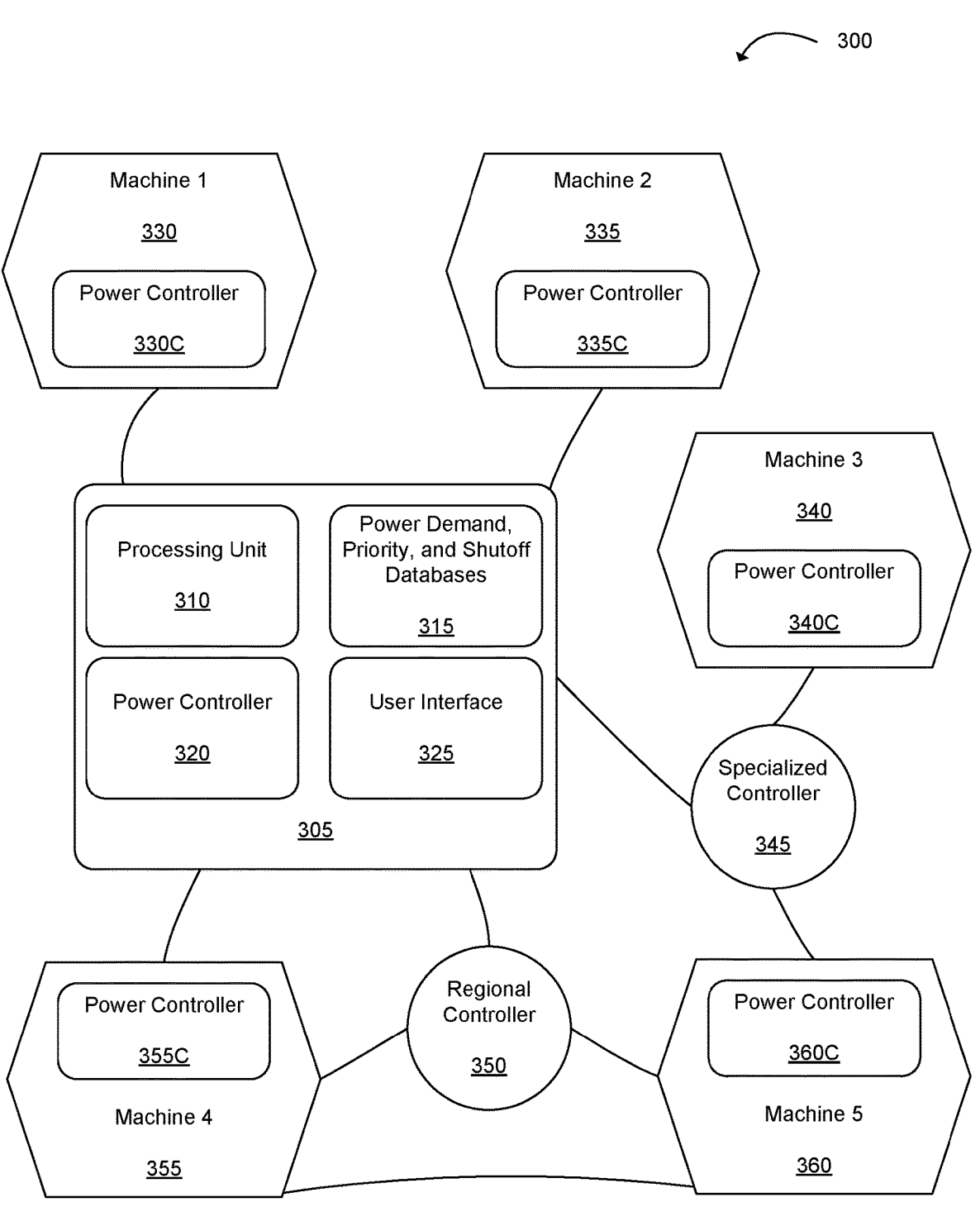
FIG. 3 represents an example mining environment with a central power management system in communication with a set of electrical machines and/or other controllers connected with one or more electrical machines in the mining environment, in accordance with one or more embodiments.

Referring to FIG. 3, a representative mining environment 300 may include an example central power management system 305. The system 305 includes a processing unit 310, which may include a processor and memory with instructions or code stored thereon for execution by the processing unit 310. A set of databases 315, such as a power demand database, a priority database, and a shutoff database, may be included in the system 305; alternatively, the databases 315 could be accessible via communication with another system. The system 305 includes power controller 320 able to effect changes in power available to machines. A user interface 325 allows for user interaction with system 305 to, for example, allow for access to information and entry of commands and instructions (such as overrides).

The system 305 is in communication with one or more machines, such as Machine 1 (330), Machine 2 (335), and Machine 4 (355) as shown in FIG. 3. The system 305 may also be connected with regional controller 350, which is in communication with Machine 4 (355) and Machine 5 (360). Regional controller 350 may be tasked with controlling a set of machines in a particular area of the mine 300. The system 305 may also be connected with specialized controller 345, which may be tasked with controlling a subset of machines in the mine 300, such as machines that are involved in certain activities (such as grinding or activities critical to safety) or that have particular power demands, rules, or restrictions. Machines may be connected to a regional or specialized controller as well as to the main system 305. Machines may also be in communication with each other to relay information on status, instructions on power restrictions, etc.

Machines 1-5 (330, 335, 340, 355, and 360) each have a corresponding power controller 330C, 335C, 340C, 355C, and 360C configured to regulate power used by each respective machine for one or more operations. The system 305, specialized controller 345, and/or regional controller 350 are able to communicate with and instruct the machine-specific controllers 330C, 335C, 340C, 355C, and 360C on restrictions to be imposed on the machine's electrical consumption. Such restrictions may be dependent on one or more conditions, or be without condition, as discussed above. The conditions may be determined automatically (for example, using sensors or automated information retrieval from networked resources with information on weather conditions or other relevant information). Machines may be able to receive "binary" restrictions that indicate whether the machine is permitted to run or not, or whether specific operations are permitted to run or not. Or the restrictions may provide more information (i.e., more than a yes/no indication regarding whether the machine may operate), such as specific times during which specified operations are permitted to run, particular durations, and specific conditions.

Each machine and regional/specialized controller (as well as system 305) may include a user interface to enable communications with operators. For example, notices and instructions on what power restrictions are to be imposed (i.e., whether the machine is permitted to run, what specific operations are restricted, etc.) and when may be communicated to an operator, authorized personnel, or other user via (for example) audiovisual (such as a display screen and/or spoken words) or tactile (such as a vibrating lever) devices. The user interface may include a user input that allows personnel to provide information on the status or location of machines, tasks, personnel, etc. The user input may also allow for entry of overrides to power restrictions if a user determines, for example, that a restriction would be unsafe or otherwise not desirable.

As an example, one of the machines in mine 300 may be a power shovel (also known as an electric mining shovel), which may be used for digging, loading, and mineral extraction. The shovel's work cycle, or digging cycle, may include the operations of digging, swinging, dumping, and returning. The cycle time for an electric shovel with a 70 degree swing radius is approximately 33 seconds. The electric shovel requires approximately 11 seconds to fill its bucket, 11 seconds for a full swing, 3 seconds for dump time, and 8 seconds to swing back and lower its dipper into the starting position for the next work cycle. The digging operation, which involves raising and crowding the bucket, consumes the most energy in the work cycle, and peak power is typically achieved within the first 5 seconds of the digging function. The swinging (slewing) operation consumes a fraction of the power required for the digging operation. The dumping operation consumes even less energy. And the swinging empty (returning) operation, which includes lowering the bucket, can result in a net positive by producing energy to be returned to the grid. Regeneration may also result from motor braking during the swing operation. Raising and lowering of the bucket can combine with slewing to result in variability in power consumption and regeneration: raising the bucket consumes energy, while lowering the bucket generates energy. Such parameters may be, at least in part, included in the demand database, and may be useful for predicting power usage and determining what restrictions to impose to reduce or regulate power consumption during different time periods.

Other examples of centralized coordination include control of: when crushers are digesting material, as coordinated with when trucks are dumping at specific crusher machines, either manually or automatically (for example, telling operators when to dump, inhibiting automatically the dumping function, staging the arrival of equipment, etc.); when mills and secondary crushing and grinding circuits start-up (which can have high power requirements); when and how many trucks go on trolley assists; when shovels start their digging cycle; when draglines start their peak cycles; when electric drills start their active drilling (i.e., their peak load); etc. Such control and coordination helps minimize overall variability in power consumption, restrict exceeding specific limits on power consumption, and control total power consumption.

If left unchecked/unmanaged, there would be instances in which global power consumption would peak or trough, varying significantly from average consumption, due to an abundance of machines entering their high or low consumption states simultaneously; with control, the standard deviation should be significantly lower. Such variability causes problems for the utility provider/grid, or the dedicated mine power generation system. Utility companies typically charge large penalties to mines for variations in demand due to the problems it causes them. Overages on a mine's own power generation grid are so disruptive that mines typically purchase significantly higher power generation capacity than would be required, something that can be very costly.

The present invention has been described in terms of one or more preferred embodiments, and it should be appreciated that many equivalents, alternatives, variations, additions, and modifications, aside from those expressly stated, and apart from combining the different features of the foregoing versions in varying ways, can be made and are within the scope of the invention. Following are additional examples. These examples are not to be construed as describing the only additions and modifications to the invention, and the true scope of the invention will be defined by the claims included in any later-filed utility patent application claiming priority from this provisional patent application. For example, although the above discussion has focused on mining environments, alternative versions could be applied to other areas in which a concentration of electrical machines with high power demands operate. It is noted that various parts of the exemplary systems and methods disclosed can be implemented using hardware, software, single integrated devices, multiple devices in wired or wireless communication, or any combination thereof.

We claim:

1. A method of orchestrating power use by electrical machines in a mining environment, comprising:
   identifying a set of electrical machines that are configured to operate simultaneously during a time period to perform mining operations in the mining environment;
   for each electrical machine in the set, retrieving a power requirement for the time period,
   wherein the power requirement for the time period is non-constant function of a plurality of machine operations to be performed in the time period;
   determining, based on the power requirements for each of the electrical machines and their predicted operations, a total predicted power usage during the time period for the set of electrical machines;
   comparing the total predicted power usage for the set of electrical machines with a threshold total power usage; and
   if the predicted power usage exceeds the threshold power usage, using a power supply controller to
   restrict one or more of the electrical machines engaged in mining operations to a low power operation during portions of the time period, thereby restricting the functionality of the restricted machines, so that an actual total power usage of the set of machines during the time period does not exceed the threshold power usage
   wherein, the set of electrical machines includes a first set of machines of a first type and a second set of machines of a second type;
   the first set of machines includes crushers and the second set of electrical machines includes haul trucks, and
   restricting one or more of the electrical machines to a low power operation during portions of the time period comprises staging the arrival of haul trucks at crushers.

2. The method of claim 1, wherein the machines are involved in the extraction, processing, and moving of materials.

3. The method of claim 1, further comprising using the power supply controller to permit one or more of the machines in the set of machines to engage in a high power operation during the time period at the same time that other machines in the set of machines are restricted to a low power operation.

4. The method of claim 1, wherein the machines in the set of electrical machines are power shovels, and the plurality of machine operations comprises digging, swinging, dumping and returning.

5. The method of claim 4, wherein the low power operation is one of pausing, stopping, swinging, dumping or returning.

6. The method of claim 4, wherein the high power operation is one of moving or digging.

7. The method of claim 1, wherein all the machines in the set of electrical machines are sources of power for one or more electrical devices in the mine.

8. The method of claim 1, wherein restricting one or more of the electrical machines to a low power operation during portions of the time period comprises inhibiting the dumping function of the haul trucks.

9. The method of claim 1, further comprising using the power supply controller to permit one or more of the machines in the first set of machines to engage in a high power operation during the time period at the same time that machines in the second set of machines are restricted to a low power operation.

10. The method of claim 9, wherein the high power operation is crusher start-up.

11. The method of claim 9, wherein the high power operation is digestion of dumped material.

12. The method of claim 1, wherein restricting one or more of the electrical machines to a low power operation comprises commanding a machine to stop operating.

13. The method of claim 1, wherein restricting one or more of the electrical machines to a low power operation comprises commanding a machine to stop moving.

14. The method of claim 1, wherein restricting one or more of the electrical machines to a low power operation comprises commanding a machine to pause operations.

15. The method of claim 1, wherein restricting one or more of the electrical machines to a low power operation comprises sending and displaying a request to a machine operator directing the operator to restrict operation to a low power operation.

16. A method of orchestrating power use by electrical machines in a mining environment, comprising:

identifying a set of electrical machines that are configured to operate simultaneously during a time period to perform mining operations in a mining environment;

for each electrical machine in the set, retrieving a power requirement for the time period;

determining, based on the power requirements for each of the electrical machines, a predicted power usage during the time period for the set of electrical machines;

comparing the predicted power usage for the set of electrical machines with a threshold power usage; and if the predicted power usage exceeds the threshold power usage, using a power supply controller to restrict a supply of power to one or more electrical machines in the set of electrical machines so that an actual power usage during the time period does not exceed the threshold power usage, wherein the one or more electrical machines to which power is restricted are selected based on relative priorities assigned for the electrical machines in the set during the time period, wherein the relative priorities are assigned by retrieving and analyzing a set of predetermined priorities, protocols, and vehicle data for machines in the set from a database and data regarding operating conditions of the machines from the machines in the set, and wherein identifying a set of electrical machines involved in the extraction, processing, and moving of materials that are configured to operate simultaneously during a time period to perform mining operations in a mining environment comprises identifying a set of electrical machines involved in the extraction, processing and moving of a specified type of material, and wherein the threshold power usage is a power budget for mining a specified type of material.

* * * * *